UNITED STATES PATENT OFFICE.

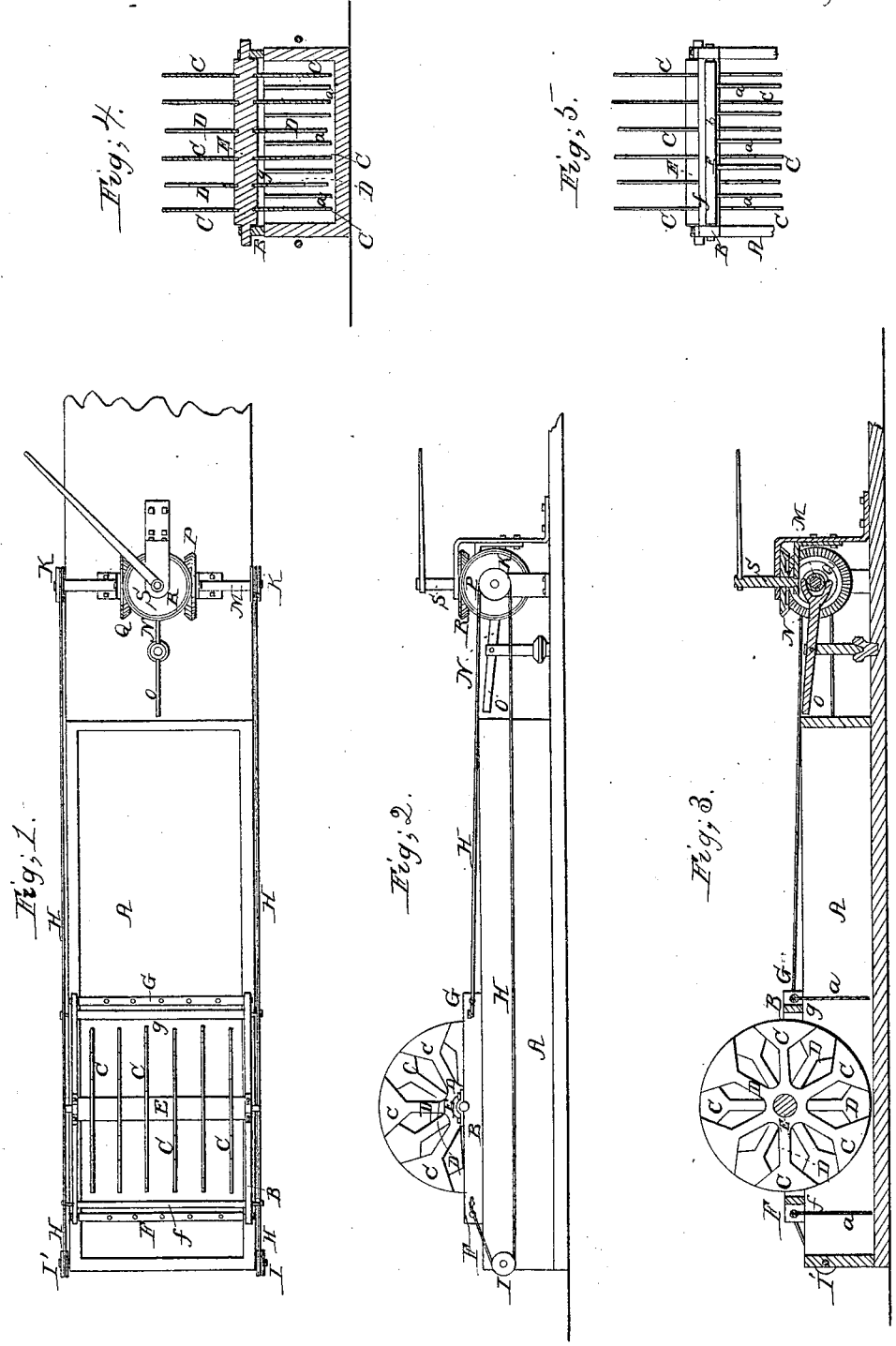

JONA. W. WARD, OF CAMBRIDGE, MASSACHUSETTS.

TEMPERING CLAY.

Specification of Letters Patent No. 5,615, dated June 6, 1848.

*To all whom it may concern:*

Be it known that I, JONATHAN W. WARD, of Cambridge, in the county of Middlesex and State of Massachusetts, have invented a new and useful Improvement or Machine for Mixing and Tempering Clay Preparatory to Its Being Struck or Molded into Bricks; and I do hereby declare that the same is fully described and represented in the following specification and accompanying drawings, letters, figures, and references thereof.

Of the said drawings Figure 1, denotes a top view of my machine. Fig. 2, is a side elevation of it. Fig. 3, a longitudinal vertical and central section of it. Fig. 4, a transverse and vertical section taken through the shaft of the series of rotating mixing knives. Fig. 5, is a front end view of the mixing carriage and one of its rakes.

In such of the figures in which the same is exhibited, A, represents a long trough made of any convenient length. In general I calculate it shall extend nearly if not entirely from one end of a brick-yard to the other end thereof. The sides of this trough serve as rails or ways to support a carriage or frame B, which is to be alternately drawn from one end of the trough to the other end of it. This carriage supports a series of revolving cutters or mixing knives and two rakes, which are made to operate on the wet clay, and cut and mix it and temper it or reduce it to the state fit to be molded into bricks, tiles, or pottery.

The series of revolving cutters or knives are seen at C, C, C, &c., as being segments or sectors or parts of circles respectively attached to arms D, D, &c., which are made to radiate from a revoluble shaft E, which extends across the carriage B, and is supported by suitable bearings or boxes applied to its side. In front of this series of knives as well as in rear of it one of two rakes F, G, is arranged as seen in the drawings. Each of the said rakes is composed of a series of vertical teeth or rods $a, a, a$, &c., and a transverse head or shaft $b$, the rods being made to project from the said shaft, and extend downward into the trough as seen in the drawings. Each of the said shafts is hung at its ends, on or by journals and bearings which permit it to freely swing or vibrate on its axis, in order that when the carriage B, is moved in either direction, the rake in advance may fall back a little so as to rest against the cross bar $f$, or $g$, (of the carriage) just in rear of it, and be drawn through the clay, the other rake being at the same time drawn out of the clay or caused to rise upward and be drawn over it. The several teeth of the rakes are arranged so as to operate in lines or paths between those made by the rotating knives. When the whole is made to operate on the clay placed in the trough, it is mixed in a thorough manner and converted into mortar with surprising saving of labor and time in comparison to what can be effected by ordinary mixing machines. The movements of the carriage cause the cutters to rotate on their common shaft and to pass into and out from the clay.

In order to move the carriage alternately back and forth on its ways and over the trough, I make use of the following described mechanism, although I do not confine my invention to the use of such as any other combination may be used which will answer the intended purposes.

H, H, are two cords or chains each of which is attached at its ends to opposite ends of the carriage B, and passes around pulleys I, K, I', K', as seen in the drawings. The pulleys I, I', have their supporting pins or journals fixed in the sides of the trough, near one end thereof, while the pulleys K, K', are placed and fixed upon a horizontal shaft M, which has a clutch N, applied to its middle part, and operated by a lever O, and made to alternately clutch one of two bevel gears P, Q, to the said shaft, the said bevel gears being placed upon the shaft and made to engage with a horizontal bevel gear R, as seen in the drawings. The gear R, is affixed on a vertical shaft S, to which a continued revolution in one direction is to be given by a horse or other proper power suitably applied to it. By means of the clutch the movement of the carriage may be reversed at any time or whenever it may have reached either end of the trough.

What I claim in the above described machine is—

The combination of a series of revoluble knives and one, two, or more rakes, as applied to a mixing trough and made to operate therewith substantially in manner and for the purpose as specified.

In testimony whereof I have hereto set my signature this seventeenth day of February, A. D. 1848.

JONATHAN W. WARD.

Witnesses:
R. H. EDDY,
CHARLES MOREY.